United States Patent
Nisimura

(10) Patent No.: US 7,036,358 B2
(45) Date of Patent: May 2, 2006

(54) DIAGNOSTIC APPARATUS FOR VALVE TIMING CONTROL SYSTEM

(75) Inventor: Toshihiko Nisimura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 68 days.

(21) Appl. No.: 10/805,577

(22) Filed: Mar. 19, 2004

(65) Prior Publication Data

US 2004/0187566 A1     Sep. 30, 2004

(30) Foreign Application Priority Data

Mar. 28, 2003   (JP) ............................. 2003-090724

(51) Int. Cl.
*G01M 15/00* (2006.01)

(52) U.S. Cl. .................................... 73/117.3

(58) Field of Classification Search .. 123/90.15–90.18; 73/116–120
See application file for complete search history.

(56) References Cited

U.S. PATENT DOCUMENTS

| | | | | |
|---|---|---|---|---|
| 5,033,290 A | * | 7/1991 | Seki et al. ................. | 73/118.1 |
| 5,549,080 A | * | 8/1996 | Uchikawa ................. | 123/90.16 |
| 5,625,143 A | * | 4/1997 | Kadota ......................... | 73/116 |
| 6,006,707 A | * | 12/1999 | Ito ........................... | 123/90.15 |
| 6,276,341 B1 | * | 8/2001 | Takahashi et al. .......... | 123/492 |
| 6,349,592 B1 | * | 2/2002 | Hirasawa et al. .......... | 73/118.1 |
| 6,752,128 B1 | * | 6/2004 | Ozeki et al. ................ | 123/479 |
| 6,840,235 B1 | * | 1/2005 | Koseki et al. ......... | 123/568.14 |
| 6,868,812 B1 | * | 3/2005 | Saito et al. ............... | 123/90.17 |

FOREIGN PATENT DOCUMENTS

JP    2001-20798 A1    1/2001

* cited by examiner

*Primary Examiner*—Eric S. McCall
*Assistant Examiner*—Jermaine Jenkins
(74) *Attorney, Agent, or Firm*—Darby & Darby

(57) ABSTRACT

A diagnostic apparatus of a valve timing control system in which a valve timing is variably controlled by changing a rotational phase between a crankshaft and a cam shaft of an engine. The apparatus has a detector for detecting a fluctuation of engine speeds of the engine following a change of engine operating conditions and for calculating a diagnosis value based on the fluctuation; and a comparator for comparing the diagnosis value with a preestablished threshold value and for judging that a failure occurs in the valve timing control system, in case where the diagnosis value exceeds the threshold value.

4 Claims, 3 Drawing Sheets

DIAGNOSTIC APPARATUS FOR VALVE TIMING CONTROL SYSTEM

BACKGROUND OF THE INVENTION

1. Field of the Invention

The present invention relates to a diagnostic apparatus for a valve timing control system, particularly for a valve timing control system in which a rotational phase between a crankshaft and a camshaft of an internal combustion engine is designed so as to change.

2. Discussion about Prior Arts

In recent years, an engine incorporating a valve timing control system in which a rotational phase between a crankshaft and a camshaft of the engine is adjustable, has been put into practical use. Generally, the valve timing control system has a variable valve timing mechanism for continuously varying at least either of an intake valve timing and an exhaust valve timing.

Since the valve timing is one of very important engine parameters, the valve timing control system needs a diagnostic apparatus in case of failures. For example, Japanese Patent Application Laid-open No. Toku-Kai-2001-20798 discloses a technique in which frequency of misfires is monitored for every operating area and in case where the frequency of misfires is high only at a low speed and low load operating area, it is judged that the high speed cam on the exhaust side is stuck, and in case where the frequency of misfires is high at low speed and low load operating areas and at intermediate speed and intermediate load operating areas, it is judged that the high speed cam on the intake side is stuck.

However, according to the technology wherein the frequency of misfires is calculated for every operating area of the engine as described in Toku-Kai-2001-20798, a burden of the calculation of the frequency on the computer increases and has such adverse effects as delays in judgments, detection errors and the like. Further, since the misfire judgments are made only at low speed and low load operating areas and at intermediate speed and intermediate load, there is a disadvantage that the range of diagnoses is restricted.

SUMMARY OF THE INVENTION

It is an object of the present invention to provide a diagnostic apparatus for a valve timing control system capable of enlarging the range of diagnoses and swiftly, securely detecting failures of the valve timing control system.

A diagnostic apparatus of a valve timing control system in which a valve timing is variably controlled by changing a rotational phase between a crankshaft and a camshaft of an engine, comprises means for detecting a fluctuation of engine speeds of the engine following a change of engine operating conditions and for calculating a diagnosis value based on the fluctuation; and means for comparing the diagnosis value with a preestablished threshold value and for judging that a failure occurs in the valve timing control system, in case where the diagnosis value exceeds the threshold value.

DETAILED DESCRIPTION OF THE PREFERRED EMBODIMENT

Figure 1:
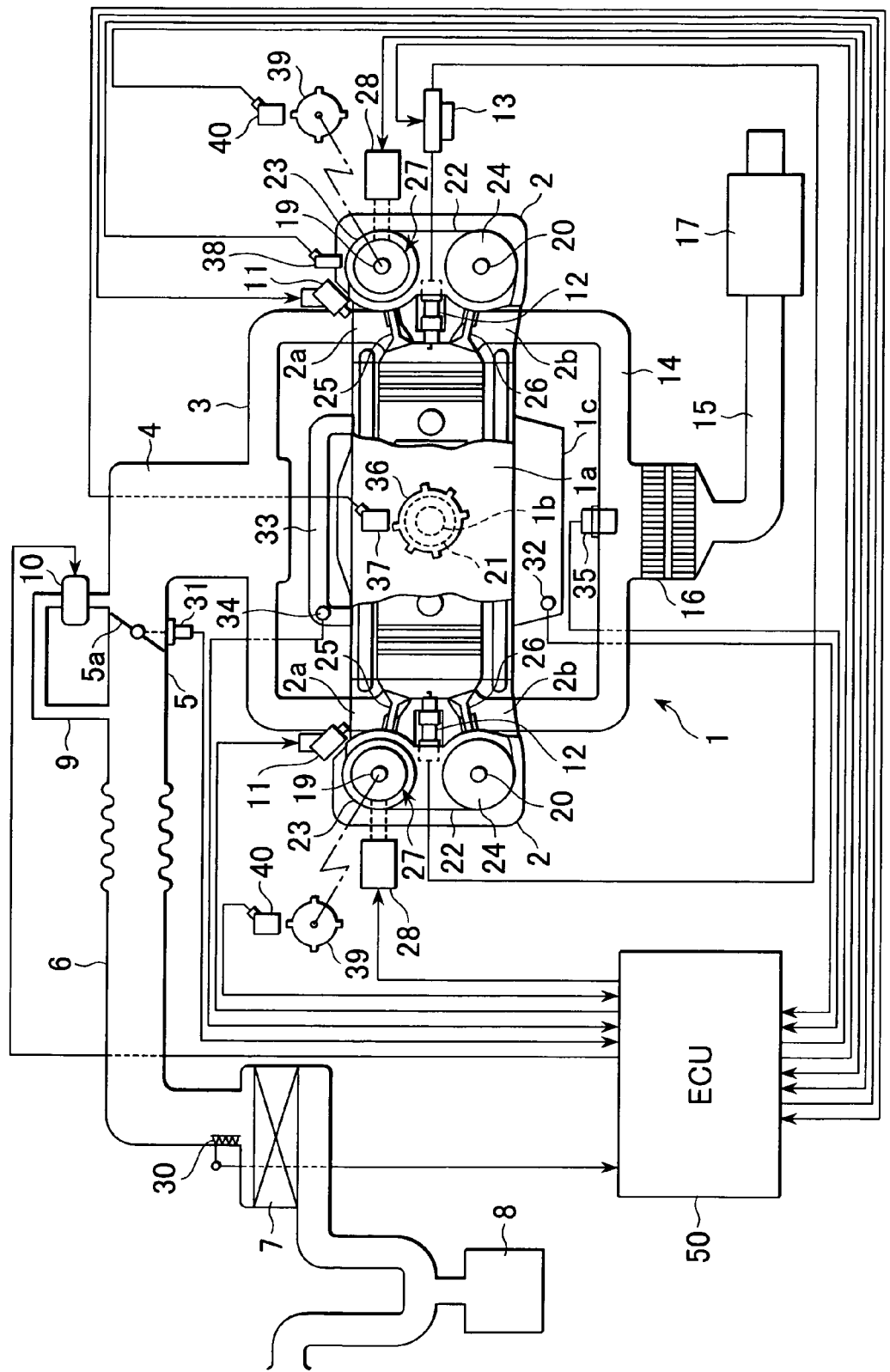
FIG. 1 is a diagrammatic illustration showing an engine incorporating a variable valve timing mechanism according to a first embodiment of the present invention.

Referring now to FIG. 1, first an overall construction of an engine incorporating a variable valve timing mechanism will be described. Reference numeral 1 denotes an engine, in this example, a horizontally opposed four cylinder engine having a cylinder block 1a divided into a left (right side of the drawing) and right (left side of the drawing) bank around a crankshaft 1b. A cylinder head 2 is mounted on the left and right banks of the cylinder block 1a, respectively. The respective cylinder heads 2, 2 have a set of an intake port 2a and an exhaust port 2b formed per each cylinder.

The intake port 2a of the respective cylinder heads 2, 2 communicates with an intake manifold 3 on the upstream side. The intake manifold 3 has an air chamber 4 in such a manner as integrating intake passages of the respective cylinders. Further, the air chamber 4 communicates with a throttle chamber 5 on the upstream side. A throttle valve 5a interlocking with an accelerator pedal (not shown) is disposed in the throttle chamber 5 and an air cleaner 7 is disposed on an intake pipe 6 upstream of the throttle chamber 5. Further, a chamber 8 is disposed on the intake pipe 6 upstream of the air cleaner 7.

Further, the intake pipe 6 is furnished with a bypass passage 9 in a manner bypassing the throttle valve 5a and an idle speed control valve 10 is interposed on the bypass passage 9. The idle speed control valve 10 is for controlling the idle speed by adjusting the amount of bypass air flowing through the bypass passage 9.

Further, a fuel injector 11 is disposed directly upstream of the intake port 2a of the respective cylinders and a spark plug 12 is disposed in the respective cylinders with its electrode exposed to a combustion chamber. The respective spark plugs 12 are connected with an ignitor built-in type ignition coil 13.

Farther, the respective exhaust ports 2b of the cylinder head 2 are connected with an exhaust manifold 14 and an exhaust pipe 15 is connected with a bifurcated portion of the exhaust manifold 14. Further, a catalytic converter 16 and a muffler 17 are interposed on the exhaust pipe 15 in this order, respectively.

The respective cylinder heads 2 of the left and right banks have an intake camshaft 19 and an exhaust camshaft 20 therein. The rotation of the crankshaft 1b is transmitted to the intake camshafts 19, 19 and the exhaust camshafts 20, 20 of the left and right banks with 2:1 rotation ratio through a crank pulley 21 secured to the crankshaft 1b, a timing belt 22, left and right intake cam pulleys 23, 23 and left and right exhaust cam pulleys 24, 24, respectively. Thus transmitted rotation of the camshafts 19, 20 gives the opening and closing motions to an intake valve 25 and an exhaust valve 26 through an intake cam (not shown) provided on the intake camshaft 19 and an exhaust cam (not shown) provided on the exhaust camshaft 20, respectively.

A hydraulically operated variable valve timing mechanism 27 in which a rotational phase (displacement angle) of the intake camshaft 19 to the crankshaft 1b is continuously varied by the relative rotation between the intake cam pulley 23 and the intake camshaft 19, is disposed between the intake cam shaft 19 and the intake cam pulley 23 of the respective banks. In this embodiment, since the variable valve timing mechanism 27 is incorporated only on the intake camshaft 19, the intake valve 25 opens and closes at variable valve timings according to operating conditions of the engine 1 with respect to the fixed valve timing of the exhaust valve 26.

Further, a flow control valve 28 for adjusting the pressure of working fluid supplied by a hydraulic pump (not shown) is equipped with the variable valve timing mechanism 27. The flow control valve 28 is for example a spool valve duty-controlled by an electronic control unit (hereinafter referred to as "ECU") 50 constituted by a micro-computer and the like. The spool valve has a spool traveling in an axial direction of the flow control valve 28 for changing over respective ports communicating with an advance chamber (hydraulic chamber for advancing valve timing) and a retard chamber (hydraulic chamber for retarding valve timing) of the variable valve timing mechanism 27 and for adjusting hydraulic pressure fed to those advance and retard chambers. The detailed construction of the variable valve timing mechanism 27 is described in Japanese Patent Application No. Toku-Kai 2000-97096 by the inventor of the present invention.

Describing sensors equipped with the engine 1, an air flow sensor 30 using a hot wire or a hot film is interposed on the intake pipe 6 directly downstream of the air cleaner 7. Further, a throttle opening angle sensor 31 is interlocked with a throttle valve 5a disposed in a throttle chamber 5. Further, an oil temperature sensor 32 is disposed in an oil pan 1c of the engine 1 and a water temperature sensor 34 is disposed in a water jacket 33 communicating between the left and right banks of the cylinder block 1a. Further, an oxygen sensor 35 is disposed upstream of the catalytic converter 16.

Further, a crank rotor 36 is mounted on the crankshaft 1b of the engine 1 and a crank angle sensor 37 is attached to the cylinder block 1a opposite to protrusions provided on the outer periphery surface of the crank rotor 36. Furthers a cylinder identifying sensor 38 is attached to the cylinder head 2 (in this embodiment left bank) opposite to protrusions provided on the rear surface of the intake cam pulley 23 which rotates at a rotation ratio 1/2 of the crankshaft 1b.

Output signals of those sensors are inputted to the ECU 50 and are processed therein. The ECU calculates miscellaneous control parameters for the fuel injector 11, the ignitor built in the ignition coil 13, the idle speed control valve 10, the flow control valve 28 of the variable valve timing mechanism 27 and the like. Based on these control parameters, various engine controls such as fuel injection control, ignition timing control, idle speed control, valve timing control and the like are performed.

First, describing the valve timing control, a target valve timing, namely, a control target value of the phase difference between the rotation angles of the crankshaft 1b and the intake cam shaft 19, is established on the basis of the engine operating conditions, for example, engine speeds and engine loads. Then, an actual valve timing, namely, a phase difference between the actual rotation angles of the crankshaft 1b and the intake cam shaft 19, is calculated based on crank pulses indicative of the crank angle outputted from the crank angle sensor 37 and cam position pulses indicative of the cam position outputted from a cam position sensor 40. Then, the variable valve timing mechanism 27 is feedback-controlled through the flow control valve 28 so that the actual valve timing agrees with the target valve timing.

Further, the ECU 50 makes periodical diagnoses of the valve timing control system including the variable valve timing mechanism 27, the flow control valve 28 and its control devise. Objects of diagnosis include exacerbated responseability due to the defective sliding performance of miscellaneous sliding sections, stickings due to jams of foreign matters and the like.

That is, when failures such as exacerbated responseability and stickings occur in the valve timing control, incomplete combustions including misfires are generated by the deviation of valve timings of the respective cylinders from an optimum condition. As a result, the engine speed has fluctuations. Accordingly, the diagnosis of the valve timing control system is to detect the deviation from the optimum condition by monitoring such fluctuations of engine speeds.

Figure 2:
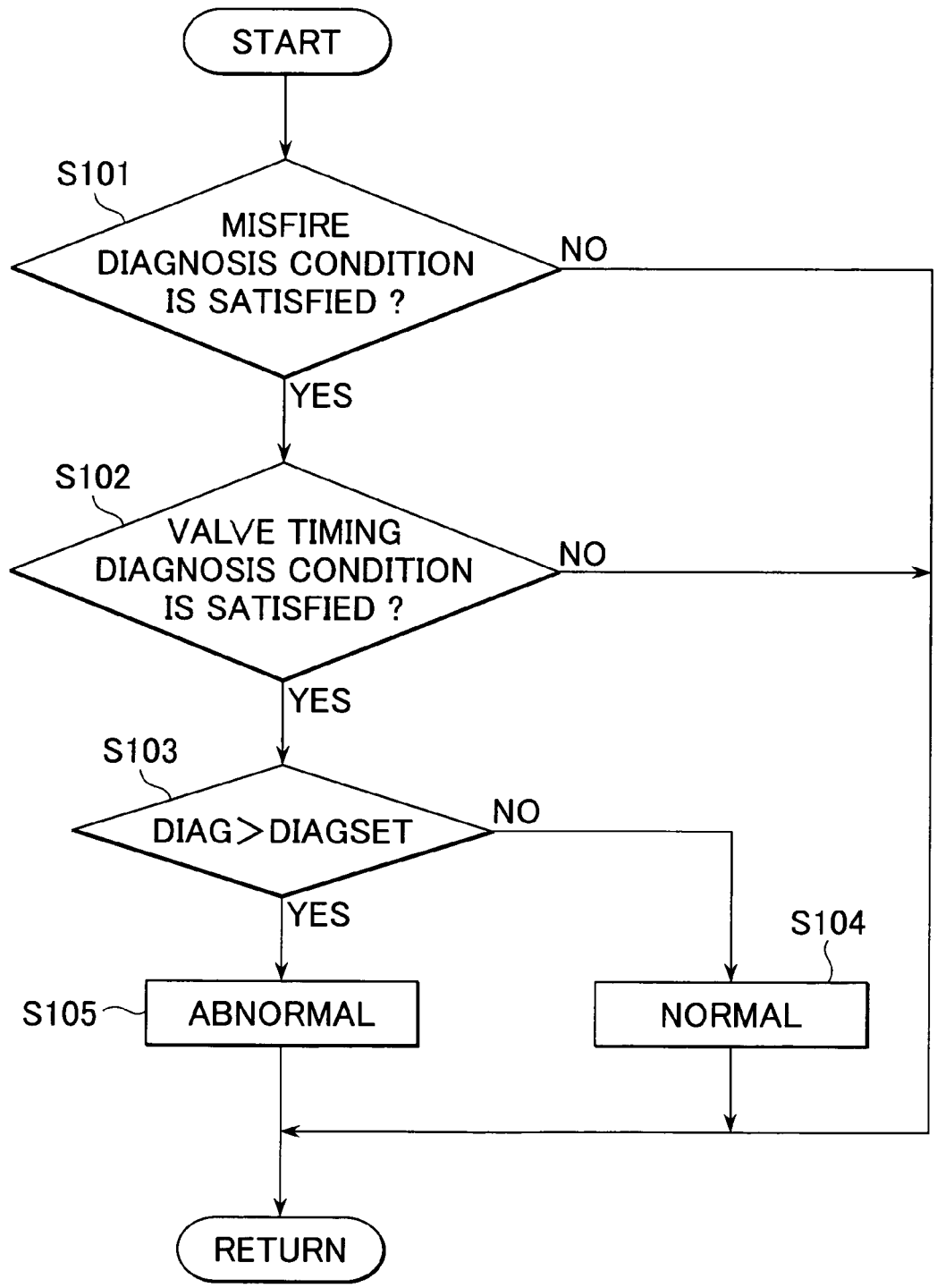
FIG. 2 is a flowchart of a diagnosis routine according to the first embodiment of the present invention.

The diagnosis of the valve timing control system will be described by reference to a flowchart of a diagnostic routine as illustrated in FIG. 2.

This diagnostic routine is executed every specified time or every specified interval. At a step S101, it is judged whether or not a misfire diagnosis condition, for example, a condition that any fuel cut is not executed, is satisfied in the present operating condition.

In case where the misfire diagnosis condition is not satisfied, the program leaves the routine without carrying out the diagnosis of the valve timing control system. In case where the misfire diagnosis condition is satisfied, the program goes to a step S102 where it is judged whether or not a valve timing diagnosis condition is satisfied. The valve timing diagnosis condition includes, for example, a state in which the engine speed Ne or the intake manifold pressure PM is stable.

As a result, in case where the valve timing diagnosis condition is not satisfied, the program leaves the diagnostic routine without carrying out the diagnosis of the valve timing control system. On the other hand, in case where the valve timing diagnosis condition is satisfied, the program goes to the step S102 to a step S103 where it is judged whether or not fluctuations of engine speeds are within a specified range.

According to the valve timing control of the present invention, for example, in an idling condition (low load low speed condition), the opening and closing timing of the intake valve 25 is set to a most retarded angle, or advance angle=0, to realize the stability of the idle speed by getting rid of a valve overlap of the exhaust valve 26 and the intake valve 25.

Further, in a mid-load area, the target valve timing is established to a small to intermediate advance angle and the opening and closing timing of the intake valve 25 is controlled on the advance side. As a result, the valve overlap of the exhaust valve 26 and the intake valve 25 increases to enhance fuel economy. Further, in a high load area, the target valve timing is established to a largest advance and the opening and closing timing of the intake valve 25 is controlled on a further advance side. As a result, the valve overlap of the exhaust valve 26 and the intake valve 25 further increases to raise engine power. Further, in a low load and high speed area, the target valve timing is established to a small advance angle and the opening and closing timing of the intake valve 25 is controlled on the retard side. As a result, the valve overlap increases to prevent an overrun of the engine speed.

Accordingly, when the engine operating condition changes, for example, when a traveling condition transfers to an idle condition, the target valve timing changes from the advance side to the retard side and as a result fluctuations of engine speeds are generated due to a sudden change in torque. These fluctuations of engine speeds are relatively small in case where the variable valve timing control system is normal, however, in case where the variable valve timing control system has an abnormal operation, the fluctuations are enlarged. Particularly, in case of the engine 1, large fluctuations of engine speeds occur due to torque differences generated between the bank having some defects in the valve timing control system and the bank having no failure. The fluctuations behave just like in case of misfires.

In general, whether the misfire is generated or not is judged from the change of the difference of the engine speeds between a cylinder in the present combustion stroke and a cylinder in a previous combustion stroke. If this change of the engine speed difference between a cylinder in a second previous combustion stroke and the cylinder in the previous combustion stroke is a negative value below a judgment criteria and the change of the engine speed difference between the cylinder in the previous combustion stroke and the cylinder in the present combustion stroke is a positive value above the judgment criteria, it is judged that the cylinder in the previous combustion stroke is in a misfire condition. An absolute value of the change of the engine speed difference, that is, the misfire diagnosis value is used as a diagnostic value DIAG for diagnosing the valve timing control system. The failure of the valve timing control system can be judged by monitoring this diagnostic value DIAG.

At a step 103, the diagnostic value DIAG is compared with a preestablished judgment threshold value DIAGSET. The judgment threshold value DIAGSET is a value for specifying that the valve timing control system operates in a normal range and is determined by simulations, experiments and the like in consideration of miscellaneous characteristics of the engine and the variable valve timing mechanism 27.

In case of DIAG≦DIAGSET, the program goes to a step S104 in which it is judged that the valve timing control system is normal and leaves the routine. In case of DIAG>DIAGSET, the program goes to a step S105 where it is judged that there is a failure in the valve timing control system. Then, failure data are stored in a backup memory and an alarm is given to a driver, leaving the routine.

The diagnosis value DIAG may be an integral value of the misfire diagnosis values (absolute value), that is, an integral value of changes of the engine speed. This integral value is compared with a judgment threshold value. If this integral value exceeds the judgment threshold value, it may be judged that the valve timing control system is abnormal.

According to the embodiment, when the displacement of the engine speed or the integral value of the engine speeds in changing the engine operating conditions exceeds a judgment threshold value, since it is judged that the valve timing control system is abnormal, sliding failures of the sliding sections of the valve timing mechanism 27 or sticking failures can be swiftly and securely detected, irrespective of the areas where the engine 1 is operative. These failures of the sliding sections and sticking failures bring higher hydraulic pressure than specified and as a result the responseability of the actual advance is exacerbated.

Figure 3:
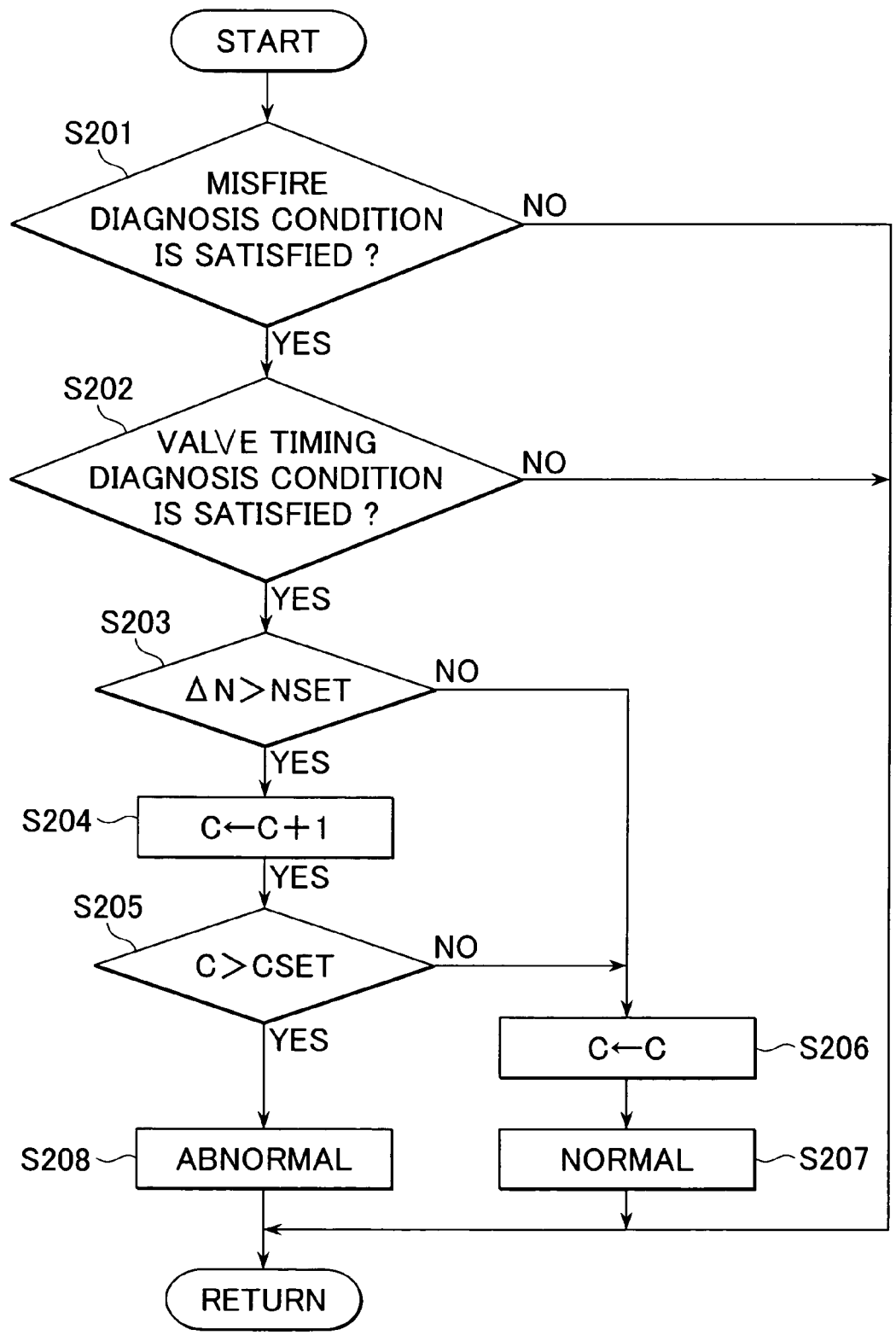
FIG. 3 is a flowchart of a diagnosis routine according to a second embodiment of the present invention.

FIG. 3 is a flowchart of a diagnostic routine according to a second embodiment of the present invention.

According to the first embodiment described above, the failures of the valve timing control system are judged by whether the magnitude of the fluctuations of engine speeds following the change of the engine operating conditions exceeds a specified level or not. On the other hand, according to the second embodiment, the failures are judged by monitoring an elapsed time until the fluctuation of the engine speeds converges.

Therefore, according to the second embodiment, after the same processes as in the diagnostic routine of the first embodiment are performed in steps S201 and S202, that is, after the misfire diagnosis condition and the valve timing diagnosis condition are satisfied respectively, the program goes to a step S203 where it is investigated whether or not the fluctuation $\Delta N$ of the engine speeds (misfire diagnosis value) following the change of the engine operating conditions exceeds a preestablished value NSET. The preestablished value NSET is a value which can be deemed to converge into a specified value.

As a result of the investigation at S203) in case of $\Delta N \leq NSET$, the program goes to a step S206 where a timer C for measuring a time until the fluctuation of engine speed converges is cleared (C←0) and at a step S207 it is judged that the valve timing control system is normal, the program leaving the routine.

On the other hand, in case of $\Delta N > NSET$, the program goes from the step S203 to a step S204 where the timer C is counted up (C←C+1) and at a step S205 it is checked whether or not the timer C exceeds a preestablished time CSET. The time CSET is a maximum time needed for the convergence of the fluctuation of the engine speed and is obtained from prior simulations or experiments in consideration of characteristics of the engine or the variable valve timing mechanism 27.

At the step S205, in case of $C \leq CSET$, the program leaves the routine through the steps S206 and S207. In case of C>CSET, that is, in case where the fluctuation of the engine speed following on the change of engine operating conditions does not converge after the preestablished time elapses, the program goes to a step S208 in which it is judged that the fluctuation does not still converge and there is a failure in the valve timing control system, leaving the routine. Then, the failure data is stored in a back-up memory for diagnosis and is warned to a driver.

The entire contents of Japanese Patent Application No. Tokugan 2003-090724 filed Mar. 28, 2003, is incorporated herein by reference.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A diagnostic apparatus of a valve timing control system for variably controlling a valve timing by adjusting a rotational phase between a crankshaft and a cam shaft of an engine, comprising:

means for detecting a fluctuation of engine speeds of said engine following a change of the valve timing and for calculating a diagnosis value by integrating the absolute value of the fluctuation of engine speeds of the engine; and means for comparing said diagnosis value with a threshold value which is set based on the characteristics of the valve timing control system and for judging that a failure occurs in said valve timing control system in case where said diagnosis value exceeds said threshold value.

2. A diagnostic apparatus of a valve timing control system for variably controlling a valve timing by adjusting a rotational phase between a crankshaft and a cam shaft of an engine, comprising:
   means for detecting a fluctuation of engine speeds following a change of the valve timing and for calculating an elapsed time until said fluctuation converges to a steady value; and
   means for judging that a failure occurs in said valve timing control system in case where said elapsed time exceeds a preestablished time which is based on the characteristics of the valve timing control system.

3. A diagnostic apparatus of a valve timing control system for variably controlling a valve timing by adjusting a rotational phase between a crankshaft and a cam shaft of an engine, comprising:
   a detector set up to detect a fluctuation of engine speeds of said engine following a change of the valve timing and to calculate a diagnosis value by integrating the absolute value of the fluctuation of engine speeds of the engine; and
   a comparator set up to compare said diagnosis value with a threshold value which is set based on the characteristics of the valve timing control system and to judge that a failure occurs in said valve timing control system in case where said diagnosis value exceeds said threshold value.

4. A diagnostic apparatus of a valve timing control system for variably controlling a valve timing by adjusting a rotational phase between a crankshaft and a cam shaft of an engine, comprising:
   a detector set up to detect a fluctuation of engine speeds following a change of the valve timing and to calculate an elapsed time until said fluctuation converges to a steady value; and
   a judger set up to judge that a failure occurs in said valve timing control system in case where said elapsed time exceeds a preestablished time which is based on the characteristics of the valve timing control system.

* * * * *